United States Patent
Agrawal et al.

(10) Patent No.: US 10,572,026 B2
(45) Date of Patent: Feb. 25, 2020

(54) REFERENCE POINT GENERATION ON A VECTOR PATH

(71) Applicant: Adobe Inc., San Jose, CA (US)

(72) Inventors: Vivek Agrawal, Noida (IN); Prashant Kumar Singh, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 154 days.

(21) Appl. No.: 15/995,792

(22) Filed: Jun. 1, 2018

(65) Prior Publication Data

US 2019/0369737 A1 Dec. 5, 2019

(51) Int. Cl.
*G06F 17/00* (2019.01)
*G06F 3/01* (2006.01)
*G06T 7/20* (2017.01)
*G06F 3/0484* (2013.01)
*G06F 3/0488* (2013.01)

(52) U.S. Cl.
CPC .......... *G06F 3/017* (2013.01); *G06F 3/04842* (2013.01); *G06F 3/04883* (2013.01); *G06T 7/20* (2013.01); *G06T 2207/20101* (2013.01)

(58) Field of Classification Search
CPC ...................................................... G06F 3/017
See application file for complete search history.

(56) References Cited

U.S. PATENT DOCUMENTS

| | | | | |
|---|---|---|---|---|
| 8,584,012 B1* | 11/2013 | Orshanskiy | ........... | G06T 11/203 715/256 |
| 10,497,158 B2* | 12/2019 | Jain | ....................... | G06T 11/203 |
| 10,510,186 B2* | 12/2019 | Batra | ....................... | G06T 19/20 |
| 2009/0213083 A1* | 8/2009 | Dicker | .................... | G06F 3/038 345/173 |
| 2013/0188875 A1* | 7/2013 | Sesum | .................. | G06F 17/211 382/198 |
| 2014/0115452 A1* | 4/2014 | Rudolph | ............... | G06F 17/214 715/256 |
| 2015/0077428 A1* | 3/2015 | Stevens | ................. | G06T 11/206 345/589 |

(Continued)

OTHER PUBLICATIONS

"iDraw User Guide: iDraw for iPad v1.4" ("iDraw"), retrieved from http://www.indeeo.com/idraw/downloads/iDrawUserGuide_iPad.pdf on Dec. 18, 2019, 72 pages. (Year: 2019).*

(Continued)

*Primary Examiner* — Amelia L Tapp
(74) *Attorney, Agent, or Firm* — Finch & Maloney PLLC

(57) ABSTRACT

Techniques are disclosed for generating a reference point on a path of a vector image using a preview reference point. In some examples, a method includes receiving selection of a path included in one or more paths of a vector image presented on a display, thereby identifying an active path; causing display, via the display, of a preview reference point on the active path; receiving a moving off-path input gesture and causing the preview reference point to move along the active path correspondingly with the moving off-path input gesture; and in response to the moving off-path input gesture terminating, set a current position of the preview reference point on the active path to a final reference point on the path, the current position of the preview reference point on the active path corresponding to a last position of the off-path input gesture. The display may be a touch-sensitive display.

20 Claims, 12 Drawing Sheets

(56) References Cited

U.S. PATENT DOCUMENTS

| | | | |
|---|---|---|---|
| 2015/0220261 A1* | 8/2015 | Maule | G06F 3/04847 |
| | | | 345/173 |
| 2016/0012276 A1* | 1/2016 | Malitz | G06K 9/00651 |
| | | | 382/113 |
| 2018/0061092 A1* | 3/2018 | Sasikumar | G06F 3/04845 |
| 2018/0276858 A1* | 9/2018 | Houser | G06T 11/001 |

OTHER PUBLICATIONS

Ideas Mob page listing app releases, retrieved from http://www.ideiasmob.com.br/en/#.XfpYeDbruF4[Dec. 18, 2019 on Dec. 18, 2019, 8 pages. (Year: 2019).*

"Design a Logo with Curved Text", retrieved from https://graphic.com/tutorials/design-a-logo-with-curved-text on Jan. 16, 2019, 17 pages.

* cited by examiner

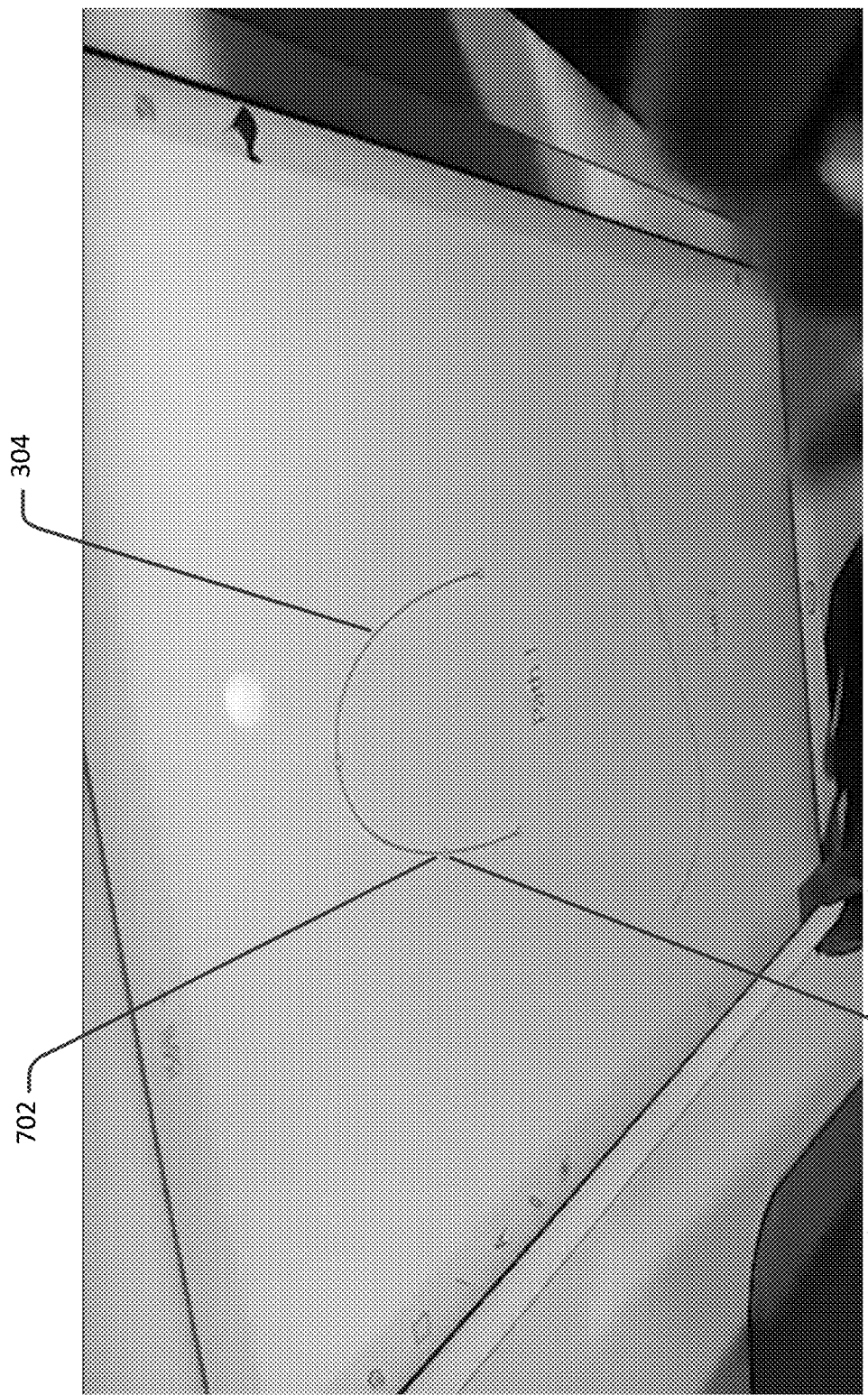

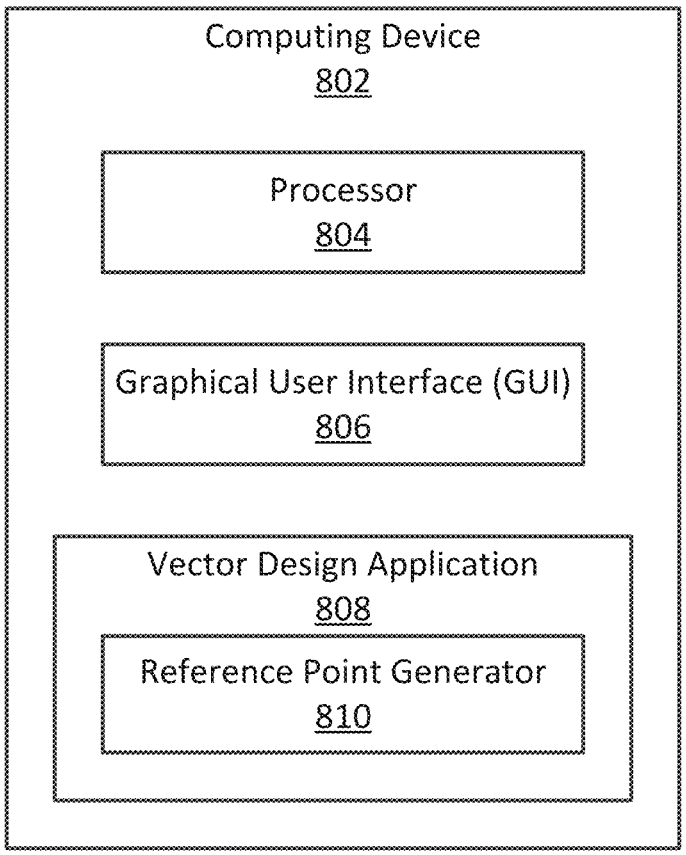

```
┌─────────────────────────────────────┐
│         Computing Device            │
│              802                    │
│                                     │
│   ┌─────────────────────────────┐   │
│   │         Processor           │   │
│   │            804              │   │
│   └─────────────────────────────┘   │
│                                     │
│   ┌─────────────────────────────┐   │
│   │ Graphical User Interface (GUI)│ │
│   │            806              │   │
│   └─────────────────────────────┘   │
│                                     │
│   ┌─────────────────────────────┐   │
│   │   Vector Design Application │   │
│   │            808              │   │
│   │  ┌───────────────────────┐  │   │
│   │  │ Reference Point Generator│ │
│   │  │          810          │  │   │
│   │  └───────────────────────┘  │   │
│   └─────────────────────────────┘   │
└─────────────────────────────────────┘
```

FIG. 8

REFERENCE POINT GENERATION ON A VECTOR PATH

FIELD OF THE DISCLOSURE

This disclosure relates generally to vector graphics, and more particularly, to generating a reference point on a path of a vector image.

BACKGROUND

Many vector design applications use Bezier curves to model curves, commonly referred to as paths, which in turn can be used to represent a vector graphics image. A path is a combination of linked Bezier curves, and a vector graphics image can be defined by one or more paths. A given path generally includes reference points, sometimes referred to as endpoints or anchor points. Specifically, an anchor point is either of the two endpoints of a Bezier curve. These reference points allow a user to interact with a vector graphics image. For instance, vector design application may allow a user to change a shape of a path by selecting and dragging a reference point on the path in a desired direction. Commonly, a reference point may not be present at a location on the path at which the user desires to perform an edit. In this case, the vector design application may allow the user to create a reference point, such as an anchor point, at the desired point on the path. Using conventional vector design applications, the user can use a pointing device or fingertip to position a pointer on the path at the desired point on the path, as illustrated in FIG. 1, to create an anchor point. If the pointer is not positioned on the path, as illustrated in FIG. 2, the user is simply not able to create an anchor point. Unfortunately, controlling a fingertip or pointing device to position a pointer at the exact point on a given path may oftentimes be a tedious and time consuming task for the user, and is at best prone to error (because it is oftentimes very difficult to touch or otherwise contact the precise location where the reference point is desired). Indeed, the problem is more pronounced for touch-sensitive displays where reference point placement is carried out by touching the screen with a stylus or a fingertip. Here, the size and bluntness of the stylus or fingertip make such placement challenging. In addition, because the stylus or fingertip needs to be positioned on the path, the stylus or fingertip often obstructs the user's view of the path and, as such, the exact point the stylus or fingertip is touching on the path is difficult for the user to see. In addition, the user is not provided any helpful visual or auditory feedback as to the exact point the stylus or fingertip is touching on the path. This can lead to many trial-and-error attempts at positioning the stylus or fingertip on the path until the reference point is created at the desired path location.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

FIG. 7 illustrates an example final reference point generated at a last previewed location on the path, in accordance with an embodiment of the present disclosure.

FIG. 8 is a block diagram illustrating selected components of an example vector design system, in accordance with an embodiment of the present disclosure.

Figure 2:
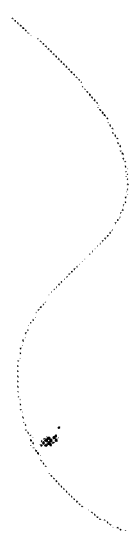
FIG. 2 illustrates an example pointer of a pointing device positioned off of a path.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for facilitating generation of a reference point on a path using a preview reference point, in the context of a vector design application. As previously noted, such reference points allow a user to interact with a vector graphics feature within a given graphical design project. The reference point may be, for instance, an anchor point or other controllable point that allows for interaction with a path. The preview reference point functions or serves as a "dummy" or "intermediate" reference point that is displayed while the user navigates placement of that reference point at a specific location on a given path. In an embodiment, the preview reference point is displayed on the path by positioning a pointer being controlled by a pointing device (user's fingertip, stylus, or other user input device) in the vicinity of the path but not directly on the path. That is, the pointer can be placed near the path so as to not impair the user's view of the path or the preview reference point. In this way, the preview reference point is said to be on-path, and the pointer is said to be off-path. The resulting on-path preview reference point provides an unimpaired visual indication of a specific point on the path at which a reference point will be generated upon final placement of the preview reference point by user. In more detail, the user can move the off-path pointer (via a dragging gesture or other suitable input gesture or action to move the off-path pointer) which in turn causes the on-path preview reference point to move correspondingly along the path. Once the on-path preview reference point is at a desired location on the path, the user can release or otherwise terminate the input gesture/action being used to move the off-path pointer. In some embodiments, for instance, the user can terminate the input gesture/action by moving the off-path pointer in or along a trajectory that is not along and proximate to the path (such as in a direction that is perpendicular to and increasingly further away from the path). In the case of a touch-sensitive display, the user can terminate the input gesture/action my exerting a suitable amount of force/pressure on the touch-sensitive display, or by performing a press-and-hold for 3 to 5 seconds or some other suitable dwell time. In a more general sense, any number of uniquely identifiable gestures and/or off-path movements may be used to indicate termination of the input gesture/action. In any such cases, this termination of the input gesture/action, which is also referred to herein as the off-path input gesture), effectively converts the last location of the on-path preview reference point to the final location of the on-path preview reference point, thereby providing the final on-path reference point. Thus, the user can readily set on-path reference points without issues such as impaired path view and inaccurate on-path reference point placement.

According to one example methodology, a user may indicate a path to which the user desires to add a reference point by tapping on (via a touchscreen) or otherwise selecting (via a mouse click or other user input) the path. For instance, in scenarios where the path is being displayed on a touch-sensitive display, the user may use a fingertip to tap on the path by placing the fingertip on the display at the location where the path is shown. Once the user taps on or near the path, the reference point generator engages and identifies the path as an active or selected path. In addition, the reference point generator determines the current location of the fingertip on the display (e.g., the fingertip or gesture location on the display), or otherwise waits for the user to touch the touch-sensitive display to initiate the placement process of the on-path reference point at the desired location. Once the user's fingertip location of the off-path input gesture is detected, the reference point generator identifies a point on the active path nearest the current fingertip location on the display, according to some embodiments. In some such cases, the reference point generator then generates a preview reference point at the identified point on active path, and displays the generated preview reference point for viewing by the user. In other embodiments, the initial location of the preview reference point on the active path doesn't have to be a point nearest the current fingertip location of the off-path input gesture. For instance, in some such embodiments, the initial location of the preview reference point can be any point on the active path, such as the farthest left point on the active path, or the farthest right point on the active path, or some midpoint on the active path. This is because movement of the preview reference point along the path is relative to movement of the user's off-path input gesture, as will be appreciated. In such example cases, the reference point generator generates a preview reference point at some arbitrary point on active path (e.g., midpoint, or other location on the active path), and causes display of the generated preview reference point for viewing by the user.

As will be further appreciated in light of this disclosure, note that the path selection and off-path input gesture may be all one continuous gesture in some embodiments, while in other embodiments may be two distinct gestures. For instance, in one example case of a single continuous gesture, the user's fingertip stays in contact with the touch-sensitive display through entire gesture, from initial selection of the target path through final positioning of the on-path reference point. Alternatively, in an example case of two distinct gestures, a selection gesture such as a tap or double tap gesture is provided on the target path to engage the reference point generator mode, or some other uniquely identifiable path selection gesture. Then, a distinct off-path drag gesture can be applied to the touch-sensitive screen to move the preview reference point along the path to some final position.

Further note that the off-path input gesture can be provided, in some embodiments, at any location of the touch-sensitive screen independent of and without concern for the location of the active path. In other embodiments, the off-path input gesture can be provided in the vicinity of or otherwise proximate to the location of the active path. Such placement of the off-path input gesture proximate to the active path may feel more intuitive for some users, while other users may appreciate the off-path input gesture being decoupled from any required proximity to the selected path. As will be further appreciated, for embodiments where proximity of the off-path input gesture to the path is a factor, note that said proximity may vary from one embodiment to the next. In some such example cases, the off-path input gesture is located in the range of about 0.3 to 1.5 inches from the active path. In a more general sense, the off-path input gesture can be provided within a predetermined distance of the active path and not directly on the active path, in some such embodiments. In still other cases where the off-path input gesture can be provided anywhere on the touch-sensitive device, note that the selection of a given path effectively informs the computing system executing the methodology that the reference point generator mode as variously provided herein is desired to be engaged based on, for example, the user tapping or double tapping the given path, or otherwise uniquely indicating to the system that the reference point generator mode is desired. Any number of unique path selection inputs can be used to make this indication. In any such cases, once the reference point generator mode is engaged, the system can be programmed or otherwise configured to treat any moving off-path input gesture, regardless of where received on the display, as indication of user's desire to move the preview reference point along the selected path. In any such embodiments, the proximity (or lack thereof, as the case may be) may be user-configurable, with the choices including various predefined distance ranges, and/or the ability to set custom distance ranges, and/or the ability to have no proximity requirement (e.g., off-path input gesture can be provided anywhere on the touch-sensitive device). Numerous variation and configurations will be apparent.

Figure 3:
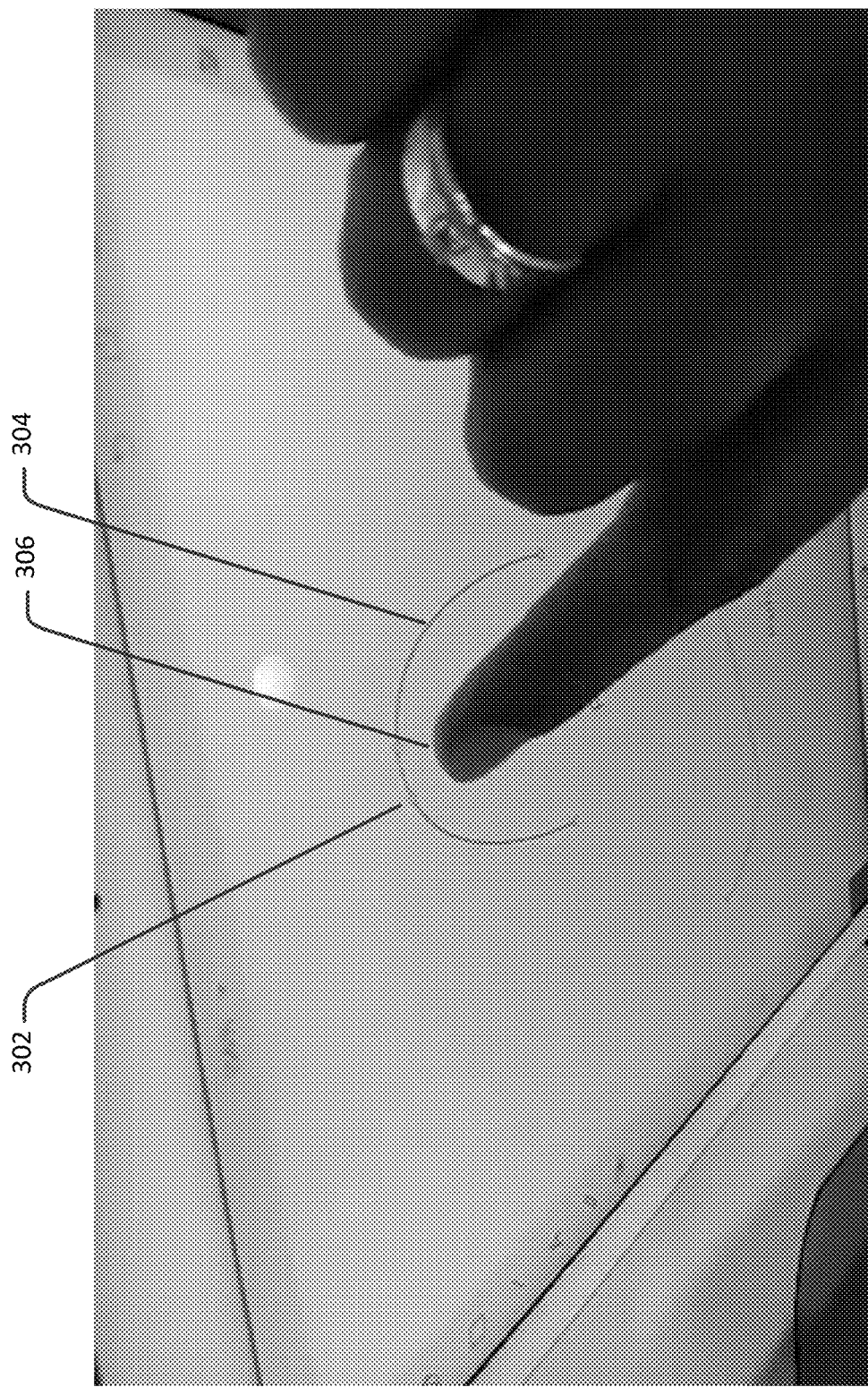
FIG. 3 illustrates an example preview reference point generated at a first point on a path, in accordance with an embodiment of the present disclosure.
Figure 4:
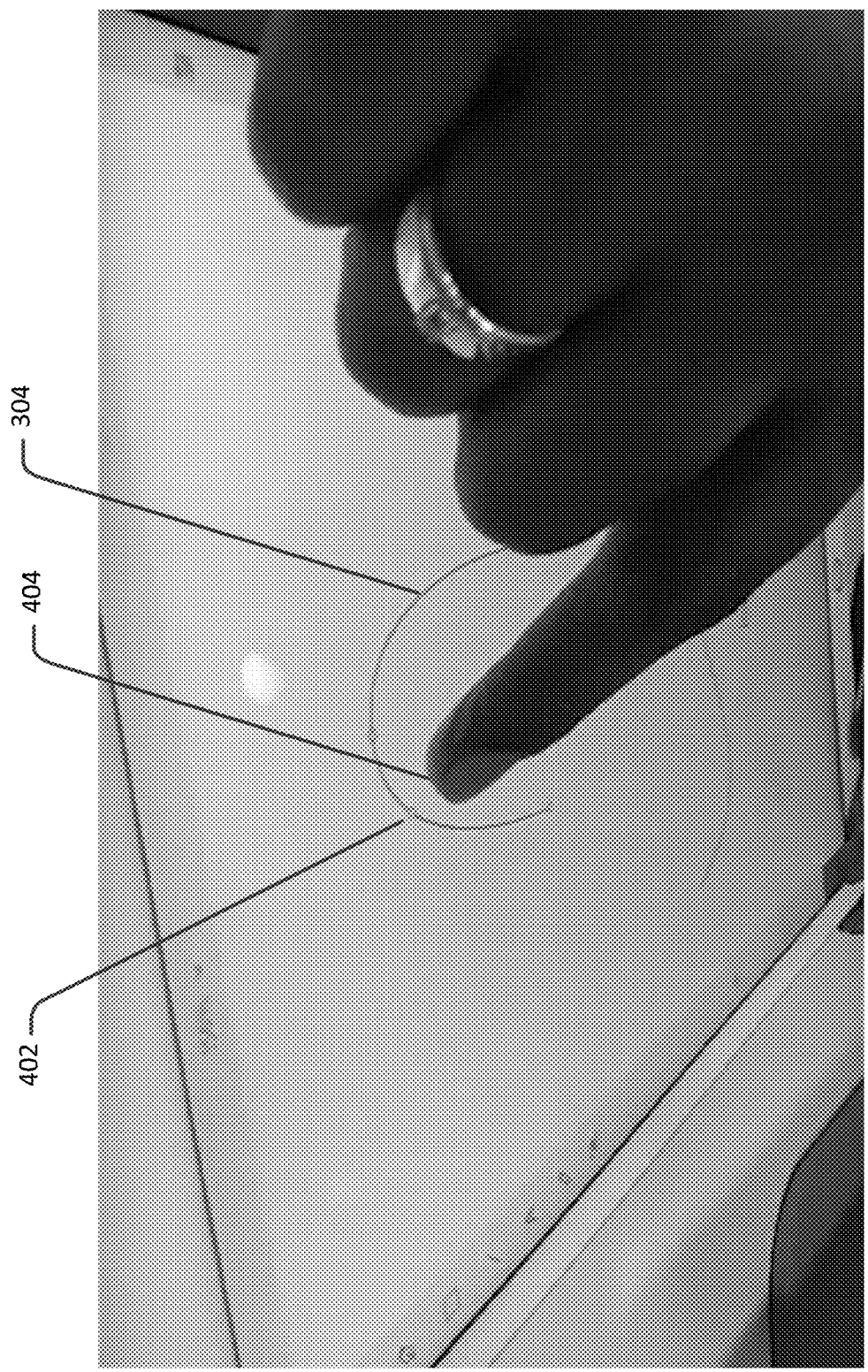
FIG. 4 illustrates an example preview reference point generated at a second point on the path, in accordance with an embodiment of the present disclosure.

An example use case is shown in FIG. 3, where a path 304 has been selected and the reference point generator mode is engaged. As can further be seen, a preview reference point 302 is generated and displayed at a first location (e.g., the identified point nearest the current fingertip location on the display) on path 304 (e.g., the active path) as a result of the fingertip tap at a relatively nearby but off-path location 306 on the display surface. While continuing to touch the display surface, the user may move the off-path fingertip along the directions of the active path, which causes the reference point generator to move the displayed on-path preview reference point along the active path in accordance with the movement of the fingertip. For example, as shown in FIG. 4, the user's fingertip has moved from off-path point 306 to off-path point 406 which in turn has caused the preview reference point to move from on-path location 302 to on-path location 402. Note that, as can be seen in the example use case of FIGS. 3 and 4, the fingertip location on the display surface need only be in the vicinity of the active path. That is, the fingertip touching the display surface need not be directly on the active path (indeed, as previously indicated, doing so would impair the user's view of the path and therefore diminish the user's experience). Thus, the user is able to obtain a clear and unimpaired view of the displayed preview reference point.

Figure 5:
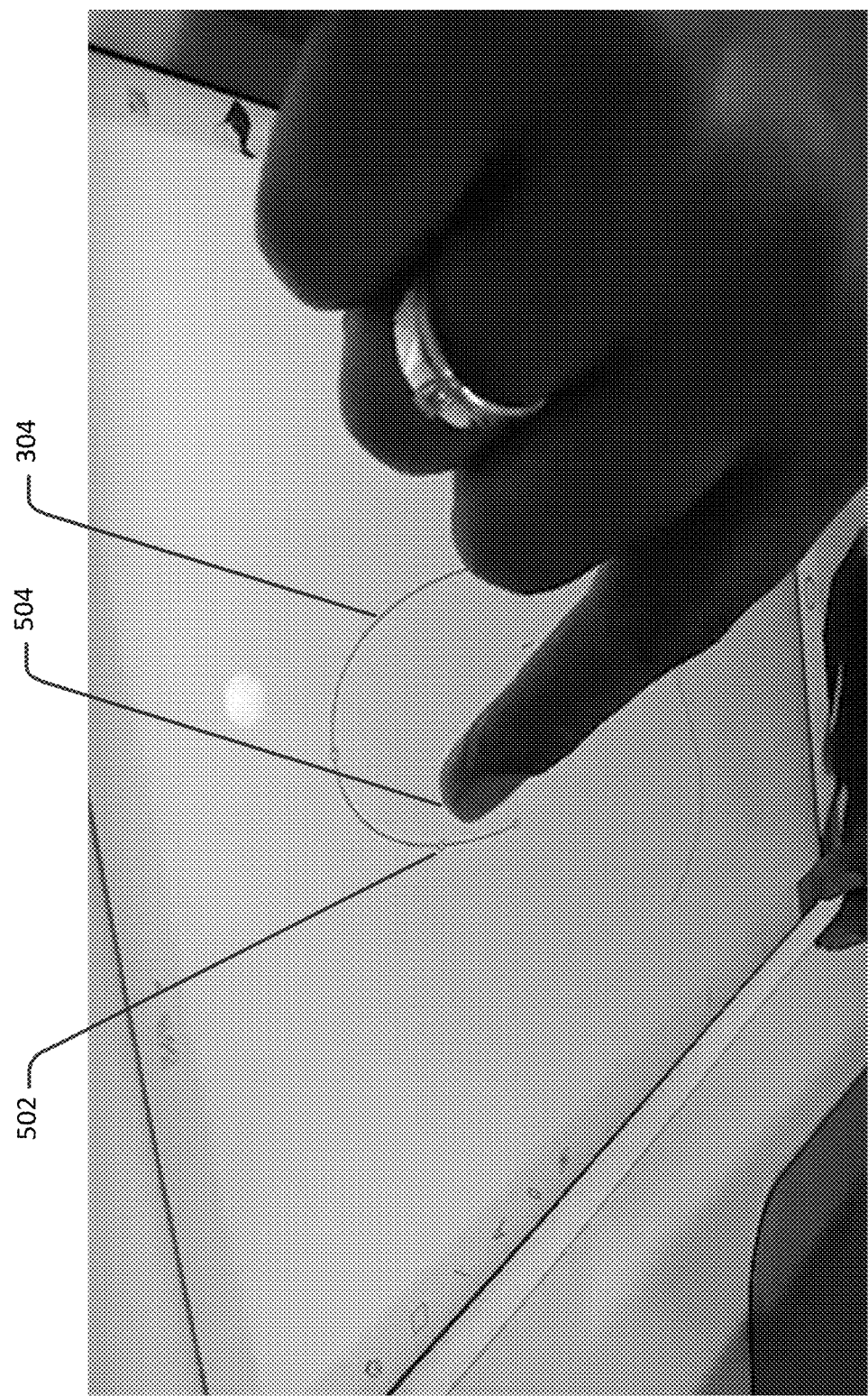
FIG. 5 illustrates an example preview reference point generated at a third point on the path, in accordance with an embodiment of the present disclosure.
Figure 6:
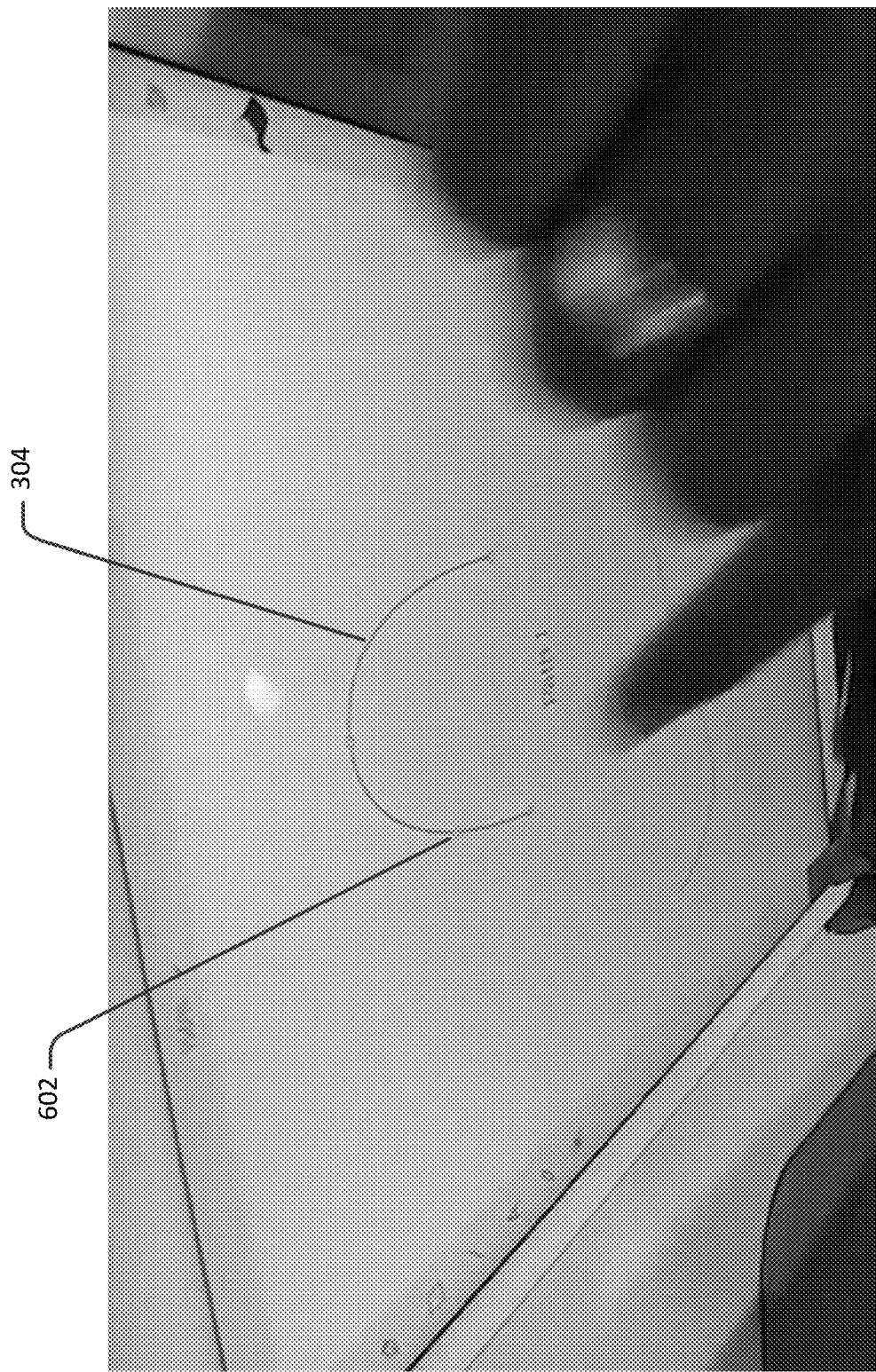
FIG. 6 illustrates an example of a fingertip being moved away from a display surface to thereby cause selection of the last reference point location as a final reference point location, in accordance with an embodiment of the present disclosure.

When the preview reference point is positioned at the desired point or location on the active path, the user may stop touching the display surface (e.g., release the dragging gesture by withdrawing fingertip or other pointing device from touchscreen), which causes the reference point generator to generate a reference point at the last previewed location on the active path. For example, as shown in FIG. 5, the user's fingertip has moved from off-path point 406 to off-path point 506 which in turn has caused the preview reference point to move from on-path location 402 to on-path location 502, which in this example use case happens to be the desired location. When the user moves the fingertip away from the display surface, as shown in FIG. 6, the last previewed location 602 (same as location 502, in this example) is identified on path 304. A reference point 702 is then be generated on path 304 at the last previewed location 602, as shown in FIG. 7, as a result of the fingertip no longer touching or otherwise being sufficiently proximate to the touchscreen display surface. Note that the on-path preview reference point is effectively replaced by the final on-path reference point 702.

In the case of a non-touch-sensitive display, a user may use an input device, such as a mouse or keyboard (e.g., arrow and return keys) or trackpad or other suitable user input device, to select or otherwise indicate a path to which the user desires to add a reference point. For instance, the user may use the mouse to position a pointer on or near a desired path. Once appropriately positioned, the user may depress a mouse button to select the path as an active path, causing the reference point generator mode to engage and a preview reference point to be displayed on the active path. While depressing the mouse button, the user may use the mouse to move the off-path pointer along the directions of the active path, which causes the displayed on-path preview reference point to move along the active path in accordance with the movement of the pointer. Similar to the touch-sensitive display discussed above, the pointer can be positioned in the vicinity of the active path (or not, as the case may be), and need not be positioned directly on the active path. This allows for quick and easy positioning of the preview reference point at the desired point on the active path. When the preview reference point is positioned at the desired point on the active path, the user may release the mouse button, which causes a final reference point to be generated at the last previewed location on the active path.

The disclosed techniques significantly improve the ease and efficiency of generating a reference point on a path in the context of a graphics design application (e.g., Adobe® Illustrator® or any other graphics applications that can benefit from reference point placement techniques provided herein. For example, in certain embodiments, the techniques allow a user to generate a reference point at a desired point on a path without having to position a pointer, which is being controlled by a pointing device such as a mouse, stylus, or fingertip, to name three examples, at the exact point or location on the path. Rather, the techniques generate a preview reference point on the path to provide perceivable and intuitive feedback to the user as to a location on the path. As previously described, a preview reference point may be generated at an exact point on a path without having to position a pointer directly on the path.

Furthermore, the disclosed techniques improve the speed and efficiency of vector design applications by facilitating the fast and efficient generation of reference points on a path. In more detail, existing solutions generate a reference point on a path by calculating a location on the path for the reference point, inserting the reference point on the path, re-rendering the path with the inserted reference point, and saving (e.g., storing) the operations that created the reference point for use in undoing the reference point when creating a subsequent, new reference point on the path. Thus, iterating this process to create a subsequent, new reference point on the path each time the reference point is repositioned on the path can be cumbersome and computationally expensive. In contrast, generating a preview reference point on a path does not require an "actual" reference point to be inserted in the path. That is, the preview reference point serves as a location indicator, which does not require any undo and insertion operation as needed for a real reference point. Indeed, until a real reference point is inserted in the path, repositioning of the preview reference point can be quickly and efficiently performed by calculating a new location on the path for the new preview reference point. These and other advantages and alternative embodiments will be apparent in light of this disclosure.

FIG. 8 is a block diagram illustrating selected components of an example vector design system 800, in accordance with an embodiment of the present disclosure. System 800 includes a computing device 802, which includes a processor 804, a graphical user interface (GUI) 806, and a vector design application 808. Computing device 802 is configured to execute vector design application 808, which includes a reference point generator 810. In an example embodiment, vector design application 808 may be implemented as computer-executable instructions stored on a non-transitory computer-readable medium that is readable by processor 804 that, when executed by such processor 804, causes computing device 802 to perform the various operations described further herein for such vector design application 808 including reference point generator 810. In various embodiments, additional components (not illustrated, such as a display, communication interface, etc.) or a subset of the illustrated components can be employed without deviating from the scope of the present disclosure. For instance, other embodiments may integrate the various functionalities of reference point generator 810 into fewer components (e.g., incorporate into vector design application 808) or more components (e.g., two or three, or more). In addition, further note that the various components of computing device 802 may all be in a stand-alone computing system according to some embodiments, while in others, may be distributed across multiple machines. For example, reference point generator 810 may be provided in a computing system distinct from computing device 802. Additionally or alternatively, GUI 806 may be provided in a computing device distinct from computing device 802. Further note that GUI 806 may be integrated into vector design application 808, or vice-versa. In a more general sense, the degree of integration and distribution of the functional component(s) provided herein can vary greatly from one embodiment to the next, as will be appreciated in light of this disclosure.

Figure 1:
FIG. 1 illustrates an example pointer of a pointing device positioned on a path.

Vector design application 808 is generally configured to facilitate the creating and editing of vector-based images, such as vector graphics. Briefly, in overview, reference point generator 810 is configured to provide for the generation of a reference point on a path of a vector image utilizing a preview reference point. As described previously, generation of a preview reference point at a specific point on a path does not require a user to directly identify the specific point on the path. According to the embodiment shown in FIG. 1, reference point generator 810 is incorporated into vector design application 808 and allows vector design application 808 to generally support vector path editing operations by allowing a user to generate a reference point at a point on a path without having to directly identifying the point on the path. Once the reference point is generated on the path, the user can use the reference point to edit or otherwise change the shape of the path. Reference point generator 810 will be further described below with respect to FIGS. 9-13.

Figure 9:
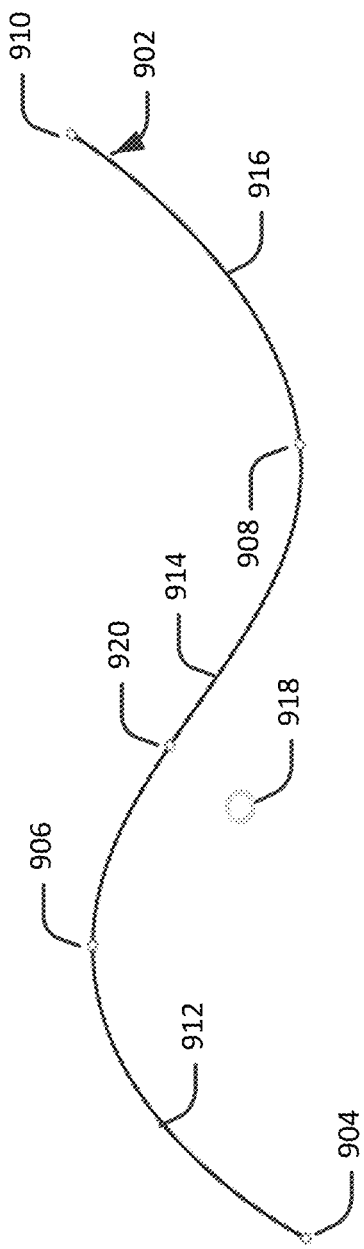
FIG. 9 illustrates an example preview reference point generated on a path based on a pointer location off of the path, in accordance with an embodiment of the present disclosure.
Figure 10:
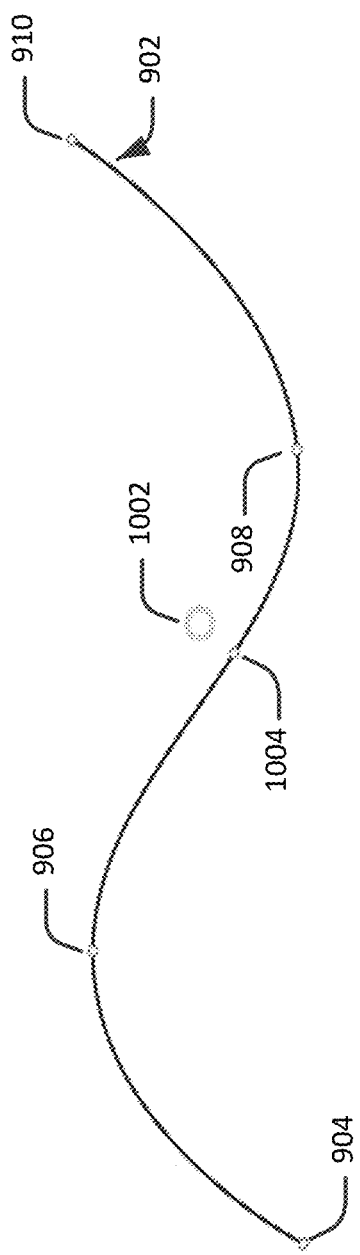
FIG. 10 illustrates another example preview reference point generated on a path based on a pointer location off of the path, in accordance with an embodiment of the present disclosure.

In an example use case and embodiment, vector design application 808 enables a user to interact with a vector image. For instance, the user may be using vector design application 808 to create a vector image. In creating the vector image, the user may have created a path 902 of the vector image, as shown in FIG. 9. As further shown in FIG. 9, vector design application 808 may generate reference points 904, 906, 908, and 910 on path 902 as a result of the user creating path 902. For example, reference points 904 and 906 may define a segment 912 of path 902, reference points 906 and 908 may define a segment 914 of path 902, and reference points 908 and 910 may define a segment 916 of path 902. Any of reference points 904, 906, 908, and 910 included on path 902 may be used, for instance, to edit path 902. However, the user may be interested in editing path 902 at a location on path 902 at which a reference point is not available for use in editing path 902. In this case, the user may select path 902 for editing by tapping on or in the vicinity of path 902. For example, the user may perform this action using a fingertip or a stylus in the case of a touch-sensitive display, or a pointing device in the case of a non-touch-sensitive display. As shown in FIG. 9, the user may tap (or hit) a point 918 in the vicinity of path 902 to select path 902 for editing. In this particular example, point 918 is depicted as a ring, as shown in FIG. 9. In response to the user tapping point 918, vector design application 808 identifies a path that is closest to point 918, which, in this case, is path 902, and activates path 902 for editing. Reference point generator 810 determines a point on path 902 that is nearest the location of point 918, and generates a preview reference point 920 at the determined point on path 902, as shown in FIG. 9. Preview reference point 920 is presented to the user, and identifies a point on path 902 at which a reference point may be generated. In general, a preview reference point serves or functions as a dummy reference point, which identifies a point or location on a path for generating a reference point. Reference point generator 810 then monitors point 918 for movement. For instance, subsequent to tapping point 918, the user may directionally move preview reference point 920 along path 902 to a specific point of interest on path 902 by moving the fingertip or stylus, in the case of a touch-sensitive display, or a pointer of a pointing device, in the case of a non-touch-sensitive display. Continuing the example use case above, the user may move point 918 to a new location at a point 1002 in an effort to directionally move preview reference point 920 along path 902, as shown in FIG. 10. In response to the user moving point 918 to point 1002, reference point generator 810 determines a point on path 902 that is nearest the location of point 1002, and generates a preview reference point 1004 at the determined point on path 902, as further shown in FIG. 10. Preview reference point 1004 is presented to the user, and identifies a point on path 902 at which a reference point may be generated.

In an example implementation, reference point generator 810 may present a sequence of preview reference points on path 902 between preview reference point 920 and preview reference point 1004 during the movement from point 918 to point 1002. For instance, reference point generator 810 may continuously determine locations on path 902 while tracking the movement from the location at point 918 to the new location at point 1002, generate a corresponding sequence of preview reference points at the determined locations on path 902, and present the generated sequence of preview reference points to the user. Note that only one preview reference point of the sequence of preview reference points may be presented to the user at any given time during the movement of the pointer from a first location to a second location, according to some embodiments.

Figure 11:
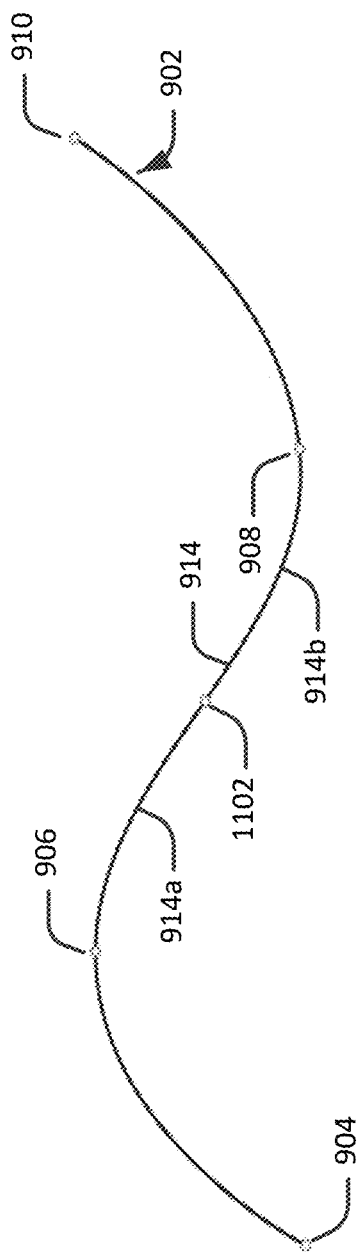
FIG. 11 illustrates still another an example reference point generated on a path based on a pointer location off of the path, in accordance with an embodiment of the present disclosure.

Continuing the example use case above, the user may continue to directionally move preview reference point 1004 along path 902 to the specific location of interest on path 902. Once the user determines that preview reference point 1004 is positioned at the specific point of interest on path 902, the user may indicate a desire (e.g., request) to generate a reference point on path 902 at the last previewed location of the preview reference point (e.g., last location of preview reference point 1004). For instance, in the case of a touch-sensitive display, the user can stop touching the display surface once the preview reference point is at the specific location of interest on the path. Additionally or alternatively, in the case of a non-touch-sensitive display, the user may indicate an interest to generate a reference point at the location of the preview reference point using a pointing device and/or by using a key or combination of keys on a keyboard. In response, vector design application 808 generates a reference point 1102 on path 902 at the last previewed location of the preview reference point, for example, preview reference point 1004, on path 902, as shown in FIG. 11. As further shown in FIG. 11, reference point 1102 may be generated at a point on segment 914 of path 902, and reference point 1102 generates a segment 914a defined by reference points 906 and 1102 and a segment 914b defined by reference points 1102 and 908. Thus, a newly generated reference point may separate a path into two paths, or a segment of a path into two segments, at the point on the path at which the reference point is generated.

Figure 12:
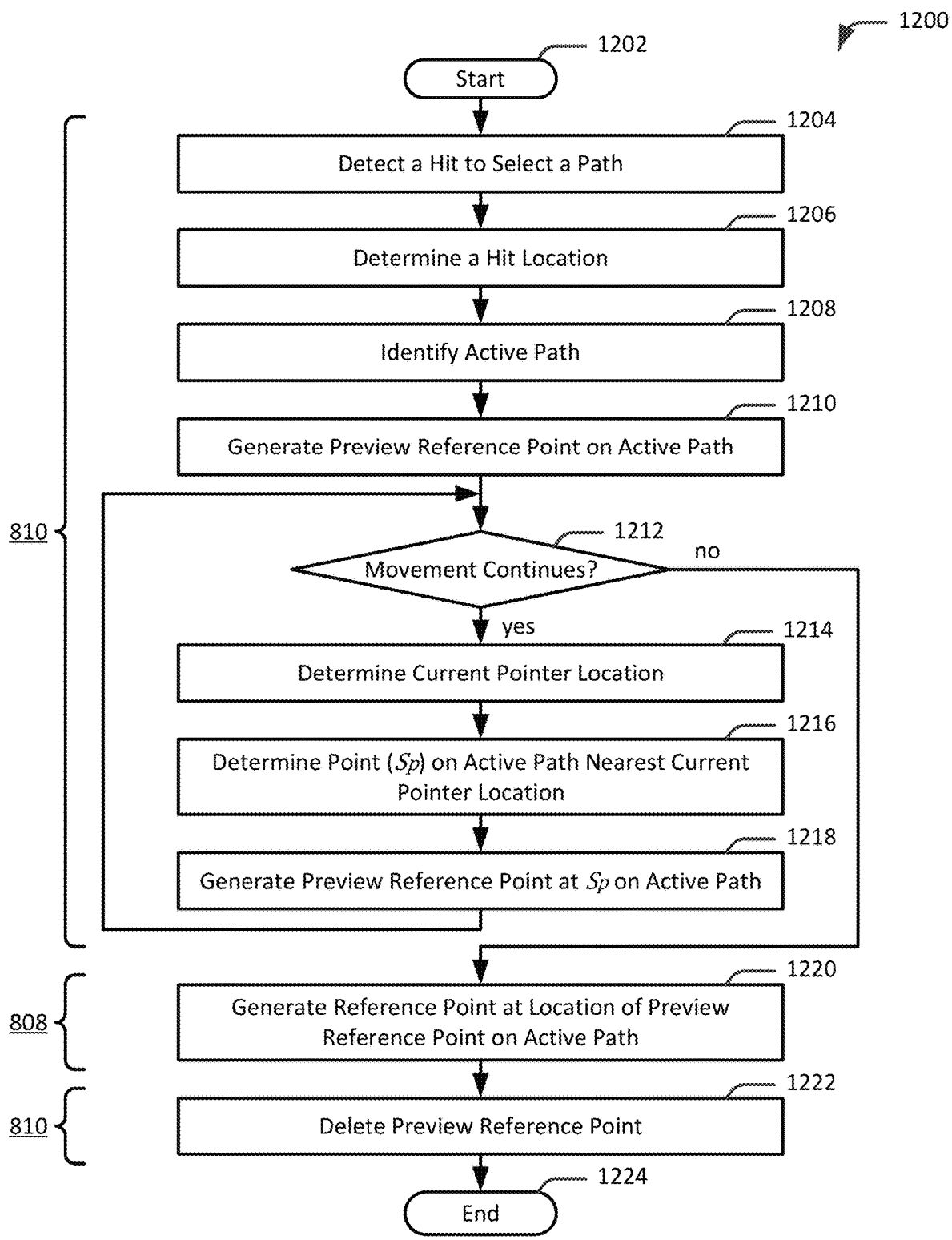
FIG. 12 is a flow diagram illustrating an example process for generating a reference point on a path based on a preview reference point, in accordance with an embodiment of the present disclosure.

FIG. 12 is a flow diagram illustrating an example process 1200 for generating a reference point on a path based on a preview reference point, in accordance with an embodiment of the present disclosure. The operations, functions, or actions illustrated in example process 1000 may in some embodiments be performed by vector design system 800 and, more particularly, vector design application 808, including reference point generator 810, of computing device 802 of FIG. 8. The operations, functions, or actions described in the respective blocks of example process 1200 may also be stored as computer-executable instructions in a non-transitory computer-readable medium, such as memory 1304 and/or data storage 1306 of a computing system 1300, which will be further discussed below. In some instances, process 1200 may be performed by components of computing device 802.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 12, process 1200 is initiated at block 1202. At block 1204, a "hit" to select a path is detected. The hit may be an action made by a user to select a path for editing. For example, one or more paths may be presented to the user. The user may be viewing one or more paths on a display, and may perform the hit action to select a path for editing. At block 1206, a location of the hit (hit location) associated with the detected hit is determined. The hit location may, for instance, be the location of the hit action on a display. The hit location may function as a current pointer location. At block 1208, a path is identified as an active path based on the hit location. An active path is a path on which a reference point is to be generated. In an example embodiment, the identified path is the path that is closest to the hit location. For example, suppose there is a first path and a second path, and that a point on the first path that is closest to the hit location is 70 pixels from the hit location, and a point on the second path that is closest to the hit location is 80 pixels from the hit location. In this case, the first path is determined to be the path that is closest to the hit location and identified as the active path. At block 1210, a preview reference point is generated on the active path. In an example embodiment, the preview reference point is generated at a point on the active path that is the nearest to the hit location (the pointer location). The generated preview reference point may be presented for viewing, for example, by the user.

At decision block 1212, a determination is made as to whether there is continued movement in the pointer location. That is, a check is made to determine whether the preview reference point is being moved along the active path. If a determination is made that there is continued movement in the pointer location, then, at block 1214, a current pointer location is determined. At block 1216, a point, Sp, on the active path that is nearest the determined current pointer location is determined. At block 1218, a preview reference point is generated at point Sp on the active path. The preview reference point generated at point SP may be presented for viewing, for example, by the user. The previously generated and presented reference point is no longer presented for viewing. Process 1200 then returns to decision block 1212.

If, at decision block 1212, a determination is made that there is no continued movement in the pointer location, then, at block 1220, a reference point is generated at the location of the preview reference point on the active path. For instance, the cease in movement of the pointer location for a predetermined threshold period of time may serve as an indication to generate a reference point on the active path. In this case, a reference point is generated at the last determined point Sp on the active path. The generated reference point is presented for viewing. At block 1222, the last preview reference point generated and presented is deleted and no longer presented for viewing. Thus, the generated reference point may be thought of as replacing the last presented preview reference point. Process 1200 ends at block 1224.

Figure 13:
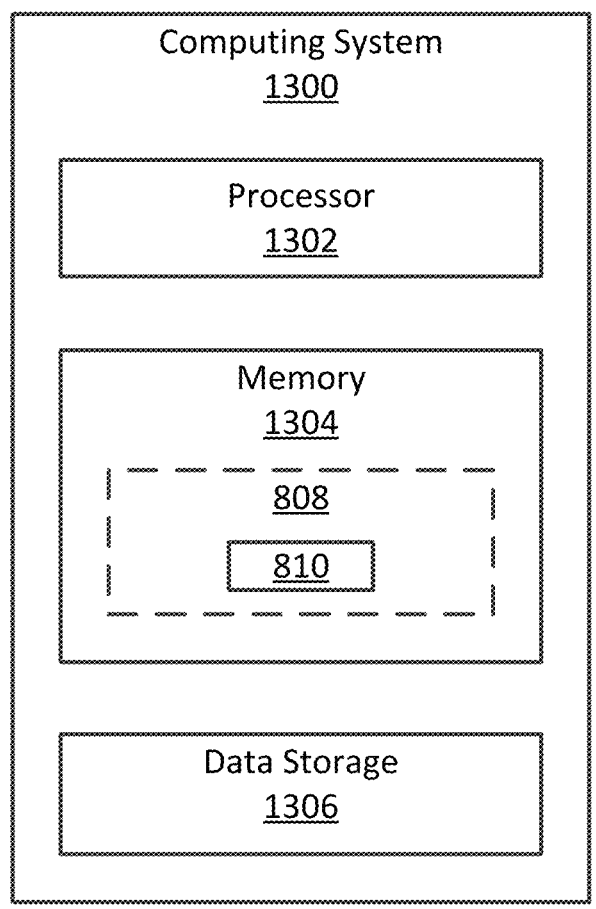
FIG. 13 is a block diagram illustrating selected components of an example computing system that may be used to perform any of the techniques as variously described in the present disclosure, according to an embodiment.

FIG. 13 is a block diagram illustrating selected components of an example computing system 1300 that may be used to perform any of the techniques as variously described in the present disclosure, according to an embodiment. In some embodiments, computing system 1300 may be configured to implement or direct one or more operations associated with some or all of the engines, components and/or modules associated with vector design application 808 of FIG. 8. For example, vector design application 808, including reference point generator 810, may be implemented in and/or using computing system 1300. In one example case, for instance, each of vector design application 808 and reference point generator 810 is loaded in memory 1304 and executable by a processor 1302. Computing system 1300 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 1300 may include processor 1302, memory 1304, and data storage 1306. Processor 1302, memory 1304, and data storage 1306 may be communicatively coupled.

In general, processor 1302 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 13, processor 1302 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1302 may be configured to interpret and/or execute program instructions and/or process data stored in memory 1304, data storage 1306, or memory 1304 and data storage 1306. In some embodiments, processor 1302 may fetch program instructions from data storage 1306 and load the program instructions in memory 1304. After the program instructions are loaded into memory 1304, processor 1302 may execute the program instructions.

For example, in some embodiments, any one or more of the engines, components and/or modules of vector design system 800 may be included in data storage 1306 as program instructions. Processor 1302 may fetch some or all of the program instructions from data storage 1306 and may load the fetched program instructions in memory 1304. Subsequent to loading the program instructions into memory 1304, processor 1302 may execute the program instructions such that the computing system may implement the operations as directed by the instructions.

In some embodiments, virtualization may be employed in computing device 1300 so that infrastructure and resources in computing device 1300 may be shared dynamically. For example, a virtual machine may be provided to handle a process running on multiple processors so that the process appears to be using only one computing resource rather than multiple computing resources. Multiple virtual machines may also be used with one processor.

Memory 1304 and data storage 1306 may include computer-readable storage media for carrying or having computer-executable instructions or data structures stored thereon. Such computer-readable storage media may include any available media that may be accessed by a general-purpose or special-purpose computer, such as processor 1302. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1302 to perform a certain operation or group of operations.

Modifications, additions, or omissions may be made to computing system 1300 without departing from the scope of the present disclosure. For example, in some embodiments, computing system 1300 may include any number of other components that may not be explicitly illustrated or described herein.

As indicated above, the embodiments described in the present disclosure may include the use of a special purpose or a general purpose computer (e.g., processor 1302 of FIG. 13) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1304 of FIG. 13) for carrying or having computer-executable instructions or data structures stored thereon.

Numerous example variations and configurations will be apparent in light of this disclosure. According to some examples, computer-implemented methods to generate a reference point on a path of a vector image in a graphic design application are described. An example computer-implemented method may include: receiving selection of a path included in one or more paths of a vector image presented on a display, thereby identifying an active path; causing display, via the display, of a preview reference point on the active path; receiving a moving off-path input gesture and causing the preview reference point to move along the active path correspondingly with the moving off-path input gesture; and in response to the moving off-path input gesture terminating, setting a current position of the preview reference point on the active path to a final reference point on the path, the current position of the preview reference point on the active path corresponding to a last position of the off-path input gesture.

In some examples, the moving off-path input gesture is provided within a predetermined distance of the active path and not directly on the active path. In other examples, the predetermined distance is user-configurable. In still other examples, the moving off-path input gesture can be provided independent of its proximity to the active path. In yet other examples, the display is a touch-sensitive display, and the moving off-path input gesture is a dragging gesture provided on the touch-sensitive display. In further examples, the display is a non-touch-sensitive display, and the moving off-path input gesture is a dragging gesture provided via a user input device. In still further examples, the selection of the path and the moving off-path input gesture are one continuous gesture. In yet further examples, each of the selection of the path and the moving off-path input gesture are one or more gestures provided within a predetermined distance of the active path, but not on the active path.

According to some examples, computer program products including one or more non-transitory machine-readable mediums encoded with instructions that when executed by one or more processors cause a process to be carried out to generate a reference point on a path of a vector image in a graphic design application are described. An example process may include: receiving selection of a path included in one or more paths of a vector image presented on a display, thereby identifying an active path; causing display, via the display, of a preview reference point on the active path; receiving a moving off-path input gesture and causing the preview reference point to move along the active path correspondingly with the moving off-path input gesture; and in response to the moving off-path input gesture terminating, setting a current position of the preview reference point on the active path to a final reference point on the path, the current position of the preview reference point on the active path corresponding to a last position of the off-path input gesture.

In some examples, the moving off-path input gesture is provided within a predetermined distance of the active path and not directly on the active path. In other examples, the predetermined distance is user-configurable. In still other examples, the moving off-path input gesture can be provided independent of its proximity to the active path. In yet other examples, the display is a touch-sensitive display, and the moving off-path input gesture is a dragging gesture provided on the touch-sensitive display. In further examples, the display is a non-touch-sensitive display, and the moving off-path input gesture is a dragging gesture provided via a user input device. In still further examples, the selection of the path and the moving off-path input gesture are one continuous gesture. In yet further examples, each of the selection of the path and the moving off-path input gesture are one or more gestures provided within a predetermined distance of the active path, but not on the active path.

According to some examples, systems to generate a reference point on a path of a vector image in a graphic design application are described. An example system may include: one or more non-transitory machine-readable mediums configured to store instructions; and one or more processors configured to execute the instructions stored on the one or more non-transitory machine-readable mediums. Execution of the instructions by the one or more processors may cause the one or more processors to: receive selection of a path included in one or more paths of a vector image presented on a display, thereby identifying an active path; cause display, via the display, of a preview reference point on the active path; receive a moving off-path input gesture and cause the preview reference point to move along the active path correspondingly with the moving off-path input gesture; and in response to the moving off-path input gesture terminating, set a current position of the preview reference point on the active path to a final reference point on the path, the current position of the preview reference point on the active path corresponding to a last position of the off-path input gesture.

In some examples, each of the selection of the path and the moving off-path input gesture are one or more gestures provided within a predetermined distance of the active path, but not on the active path. In other examples, the display is a touch-sensitive display, and the moving off-path input gesture is a dragging gesture provided on the touch-sensitive display. In still other examples, the display is a non-touch-sensitive display, and the moving off-path input gesture is a dragging gesture provided via a user input device.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to generate a reference point on a path of a vector image in a graphic design application, the method comprising:
    receiving selection of a path included in one or more paths of a vector image presented on a display, thereby identifying an active path;
    causing display, via the display, of a preview reference point on the active path;
    receiving a moving off-path input gesture and causing the preview reference point to move along the active path correspondingly with the moving off-path input gesture; and
    in response to the moving off-path input gesture terminating, setting a current position of the preview reference point on the active path to a final reference point on the path, the current position of the preview reference point on the active path corresponding to a last position of the off-path input gesture.

2. The method of claim 1, wherein the moving off-path input gesture is provided within a predetermined distance of the active path and not directly on the active path.

3. The method of claim 2, wherein the predetermined distance is user-configurable.

4. The method of claim 1, wherein the moving off-path input gesture can be provided independent of its proximity to the active path.

5. The method of claim 1, wherein the display is a touch-sensitive display, and the moving off-path input gesture is a dragging gesture provided on the touch-sensitive display.

6. The method of claim 1, wherein the display is a non-touch-sensitive display, and the moving off-path input gesture is a dragging gesture provided via a user input device.

7. The method of claim 1, wherein the selection of the path and the moving off-path input gesture are one continuous gesture.

8. The method of claim 1, wherein each of the selection of the path and the moving off-path input gesture are one or more gestures provided within a predetermined distance of the active path, but not on the active path.

9. A computer program product including one or more non-transitory machine-readable mediums encoded with instruction that when executed by one or more processors cause a process to be carried out to generate a reference point on a path of a vector image in a graphic design application, the process comprising:
receiving selection of a path included in one or more paths of a vector image presented on a display, thereby identifying an active path;
causing display, via the display, of a preview reference point on the active path;
receiving a moving off-path input gesture and causing the preview reference point to move along the active path correspondingly with the moving off-path input gesture; and
in response to the moving off-path input gesture terminating, setting a current position of the preview reference point on the active path to a final reference point on the path, the current position of the preview reference point on the active path corresponding to a last position of the off-path input gesture.

10. The computer program product of claim 9, wherein the moving off-path input gesture is provided within a predetermined distance of the active path and not directly on the active path.

11. The computer program product of claim 10, wherein the predetermined distance is user-configurable.

12. The computer program product of claim 9, wherein the moving off-path input gesture can be provided independent of its proximity to the active path.

13. The computer program product of claim 9, wherein the display is a touch-sensitive display, and the moving off-path input gesture is a dragging gesture provided on the touch-sensitive display.

14. The computer program product of claim 9, wherein the display is a non-touch-sensitive display, and the moving off-path input gesture is a dragging gesture provided via a user input device.

15. The computer program product of claim 9, wherein the selection of the path and the moving off-path input gesture are one continuous gesture.

16. The computer program product of claim 9, wherein each of the selection of the path and the moving off-path input gesture are one or more gestures provided within a predetermined distance of the active path, but not on the active path.

17. A system to generate a reference point on a path of a vector image in a graphic design application, the system comprising:
one or more non-transitory machine-readable mediums configured to store instructions; and
one or more processors configured to execute the instructions stored on the one or more non-transitory machine-readable mediums, wherein execution of the instructions causes the one or more processors to
receive selection of a path included in one or more paths of a vector image presented on a display, thereby identifying an active path;
cause display, via the display, of a preview reference point on the active path;
receive a moving off-path input gesture and cause the preview reference point to move along the active path correspondingly with the moving off-path input gesture; and
in response to the moving off-path input gesture terminating, set a current position of the preview reference point on the active path to a final reference point on the path, the current position of the preview reference point on the active path corresponding to a last position of the off-path input gesture.

18. The system of claim 17, wherein each of the selection of the path and the moving off-path input gesture are one or more gestures provided within a predetermined distance of the active path, but not on the active path.

19. The system of claim 17, wherein the display is a touch-sensitive display, and the moving off-path input gesture is a dragging gesture provided on the touch-sensitive display.

20. The system of claim 17, wherein the display is a non-touch-sensitive display, and the moving off-path input gesture is a dragging gesture provided via a user input device.

* * * * *